L. COLETTA.
AEROPLANE.
APPLICATION FILED APR. 16, 1920.
1,343,433.
Patented June 15, 1920.
2 SHEETS—SHEET 1.
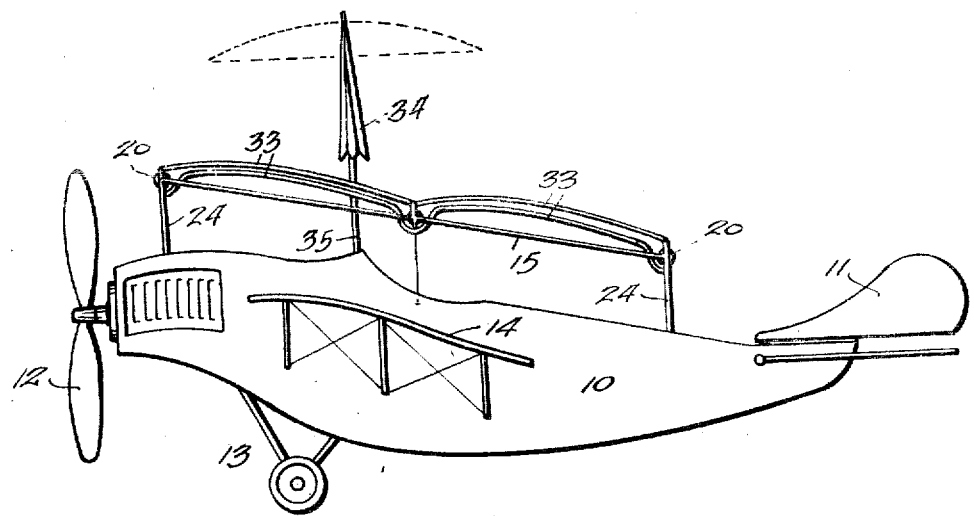
FIG. 1
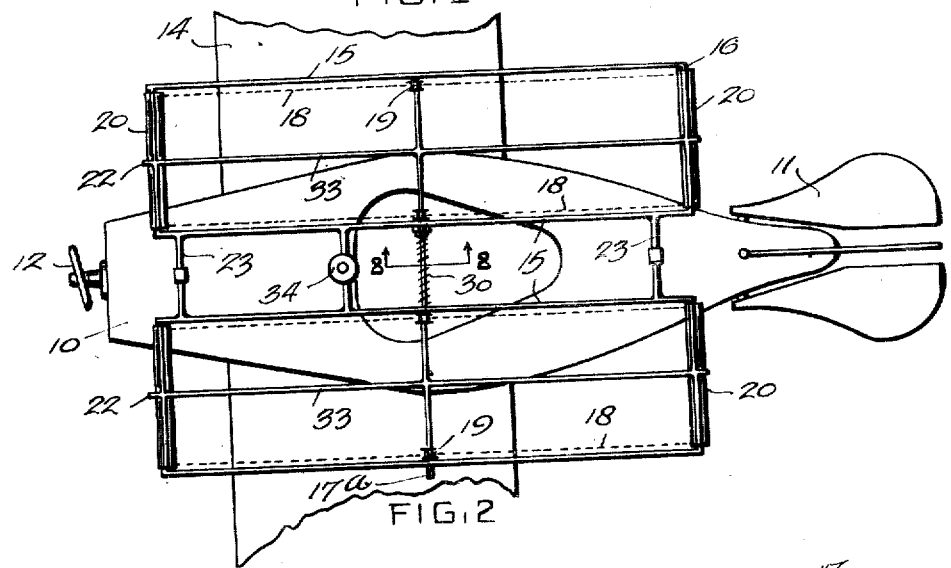
FIG. 2
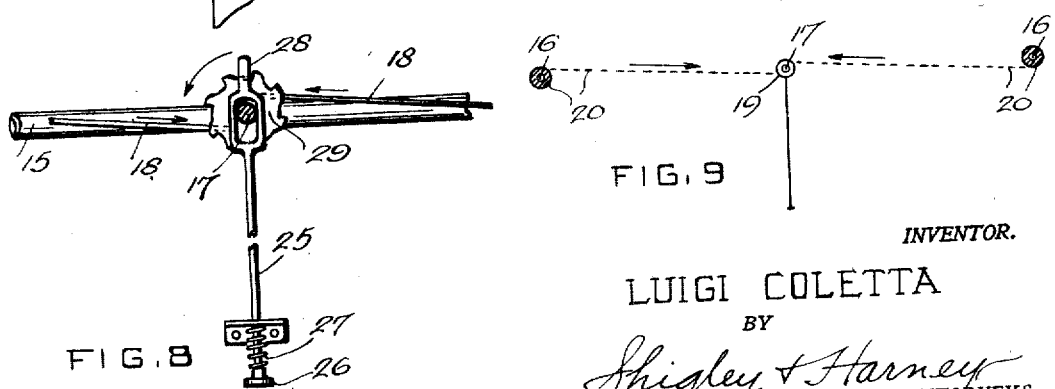
FIG. 8
FIG. 9
INVENTOR.
LUIGI COLETTA
BY
Shigley & Harney
ATTORNEYS L. COLETTA.
AEROPLANE.
APPLICATION FILED APR. 16, 1920.
1,343,433.
Patented June 15, 1920.
2 SHEETS—SHEET 2.
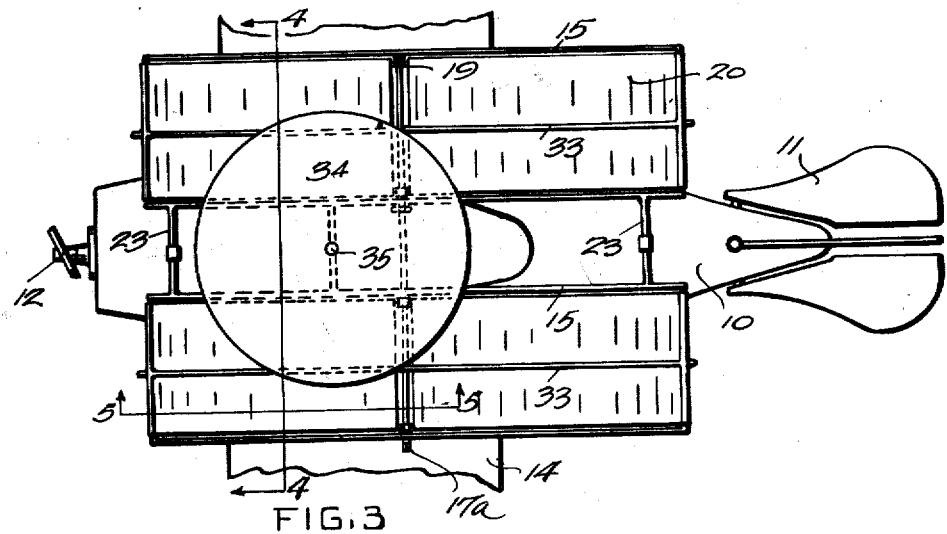
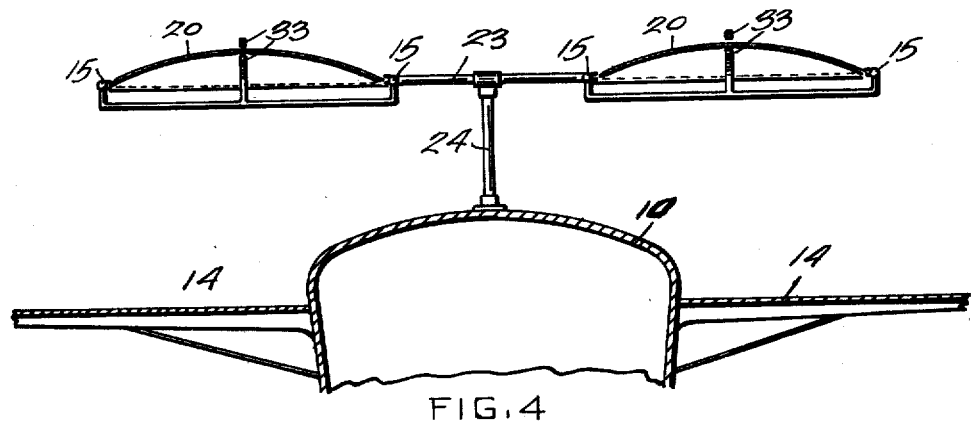
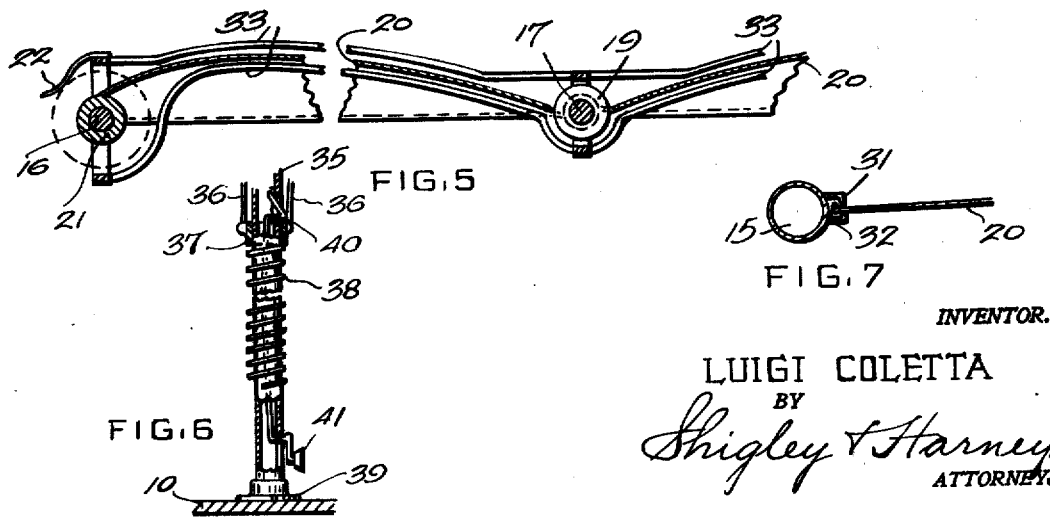
INVENTOR.
LUIGI COLETTA
BY
Shigley & Harney
ATTORNEYS

UNITED STATES PATENT OFFICE.

LUIGI COLETTA, OF COLUMBUS, OHIO, ASSIGNOR OF THIRTY-FIVE ONE-HUNDREDTHS TO FRANK ALICANDRO, OF COLUMBUS, OHIO.

AEROPLANE.

1,343,433.      Specification of Letters Patent.      Patented June 15, 1920.

Application filed April 16, 1920. Serial No. 374,431.

*To all whom it may concern:*

Be it known that I, LUIGI COLETTA, a subject of the King of Italy, residing at Columbus, in the county of Franklin and State of Ohio, have invented certain new and useful Improvements in Aeroplanes, of which the following is a specification.

My present invention relates generally to aeroplanes, and more particularly to that type of flying machines known as monoplanes, my object being to lend stability and steadiness thereto especially in descending, by the provision of means normally supported in inactive position and which in active position coöperate with and augment the normal wing surface of the machine.

More particularly my invention aims at the provision of normally housed and inactive means capable of movement to active position under control of the operator and of such nature as to avoid interference under normal operation of the machine and the well known climbing abilities, speed, and easy handling of machines of this type.

In the accompanying drawings illustrating my present invention and forming a part of this specification, Figure 1 is a side view illustrating the practical application of my invention in its normal inoperative position, Fig. 2 is a partial top plan view of Fig. 1, Fig. 3 is a partial top plan, the parts being in active position, Fig. 4 is a partial transverse section on line 4—4 of Fig. 3, Fig. 5 is a partial longitudinal section on line 5—5 of Fig. 3, Fig. 6 is a sectional side view of the parachute mast, Fig. 7 is an enlarged detail cross section through one of the frame side bars, Fig. 8 is a detail section, enlarged, on line 8—8 of Fig. 2, and, Fig. 9 is a diagram of the movement of certain parts to be hereinafter referred to.

Referring now to these figures, I have shown in Fig. 1 the fuselage 10, tail structure 11, propeller 12, landing gear 13, a wing 14 of an aeroplane of the monoplane type, the wings 14 being normally active and rigidly outstanding from the fuselage sides as usually constructed.

It is to this type of machine, needing stability and steadiness especially in descent, that my invention proposes normally inactive means which, when in active position, will augment the wing surface for this purpose.

Above the fuselage 10 are laterally spaced longitudinally elongated frames, each consisting of side bars 15, end bars 16 and a central cross shaft 17, the latter being continuous through and between the two frames, and being rotatable to wind and unwind flexible connections or cables 18, the inner ends of which are attached to small winding drums 19 secured on the shaft within, and adjacent to opposite sides of, the said shaft.

The cables 18 are connected at their outer ends to the inner ends of flexible frame coverings or curtains 20 which are normally rolled around rollers 21 on the forward and rear end bars 16 as seen in dotted lines in Fig. 3 and held in this position by small leaf springs 22 whose free ends bear on and frictionally engage the rolled coverings or curtains and thus hold the same against accidental displacement. These springs 22 are carried by the end bars 16 and permit the coverings to be unrolled and drawn inwardly to the shaft 17 when the latter is rotated in one direction.

The two frames are united by connecting cross bars 23 and are supported in vertically spaced relation to, and horizontally above, the fuselage 10 by uprights 24 whose lower ends are suitably anchored to the fuselage, and the coverings or curtains are controlled by an upright controlling rod 25 whose lower end has a control button or head 26 within convenient reach of the operator in the fuselage 10. This rod is normally held in lower position by a spring 27 and, as particularly seen in Fig. 8 has an angular upper end 28 in the nature of a pawl engaging a ratchet wheel 29 on the shaft 17 between the upper frames.

The shaft 17 is also provided with an actuating spring 30 coiled therearound between the cover frames, one end of the spring being attached to the shaft and the other end anchored to the frames. One end of shaft 17 projects slightly beyond one of the frames and is provided with a squared or polygonal extremity 17$^a$ for engagement by a socket wrench and the like in order to rotate the shaft and place the spring under tension which is its normal condition. Thus the operator need only press upwardly against the button 26 to shift the rod 25 vertically and release its angular end from the ratchet wheel 29. This frees shaft 17 for rotation and during this rotation the cables 18 will be wound in opposite directions around the drums 19 so as to draw the coverings 20 inwardly to the effective position shown in Fig. 3.

As shown in Fig. 7 the side bars 15 have slotted guide ribs 31 along their inner sides in which the side edges 32 of the coverings 20 are guided in their movement.

Each of the frames is furthermore traversed by lengthwise vertically spaced and centrally disposed guide strips 33 which are arched as particularly seen in Fig. 5, between the end bars 16 and the shaft 17. Each covering 20 moves with its central portion between the guide strips 33 so that when drawn inwardly to active position, each covering forms an effective sustaining surface of saucer like form capable of augmenting the normal wing surface of the machine, with the concave side lowermost.

I may also supplement or augment the normal wing surface by additional means in the nature of a parachute 34 of umbrella-like form, normally collapsed around the upper portion of its tubular supporting mast 35 and having ribs 36 connected to a collar 37 around the mast as plainly seen in Fig. 6. This collar is shiftable vertically to open the parachute by a spring 38 around the lower portion of the mast 35 whose lower flanged end 39 is suitably anchored on a portion of the fuselage 10 within convenient reach of the operator. The collar 37 is normally held in lower position with the parachute collapsed, by means of a spring catch 40 in the lower portion of the mast and projecting outwardly through a slot thereof. The catch 40 has a depending extension provided with a controlling finger piece 41 also projecting outwardly through a mast slot to provide for its inward pressure by the operator. When this is done the collar 37 is released and spring 38 initially acts to raise the collapsed parachute to a point where the air catches the same.

It is thus obvious my invention provides means of the nature and for the purpose, capable of ready convenient control by the operator and adapted to permit of free uninterrupted movement and manipulation of the machine under ordinary circumstances

I claim:

1. The combination with the fuselage of an aeroplane, of frames disposed in laterally spaced relation and in a horizontal plane above the fuselage, connections between the frames and between the frames and the fuselage, a rotatable shaft extending between and through the frames and having an actuating spring engaging the same between the frames and a polygonal extension at one end, a ratchet wheel on the shaft, a spring actuated control rod depending from the said shaft, having a pawl at its upper end engaging the ratchet wheel and having its lower end within convenient reach of the fuselage, winding drums carried by the shaft within the said frames, flexible connections attached at one end to the said drums, said frames including side bars and end bars, flexible coverings normally rolled on the end bars and to which the said flexible connections are attached, and means for guiding the flexible coverings during inward movement toward the said shaft when the latter is released and rotates under tension of its spring.

2. The combination with the fuselage of an aeroplane, of frames disposed in laterally spaced relation and in a horizontal plane above the fuselage, connections between the frames and between the frames and the fuselage, a rotatable shaft extending between and through the frames and having an actuating spring engaging the same between the frames and a polygonal extension at one end, a ratchet wheel on the shaft, a spring actuated control rod depending from the said shaft, having a pawl at its upper end engaging the ratchet wheel and having its lower end within convenient reach of the fuselage, winding drums carried by the shaft within the said frames, flexible connections attached at one end to the said drums, said frames including side bars and end bars, flexible coverings normally rolled on the end bars and to which the said flexible connections are attached, and means for guiding the flexible coverings during inward movement toward the said shaft when the latter is released and rotates under tension of its spring, said guide means including slotted guide portions along the side bars of the frames and with which the side edges of the coverings coöperate.

3. The combination with the fuselage of an aeroplane, of frames disposed in laterally spaced relation and in a horizontal plane above the fuselage, connections between the frames and between the frames and the fuselage, a rotatable shaft extending between and through the frames and having an actuating spring engaging the same between the frames and a polygonal extension at one end, a ratchet wheel on the shaft, a spring actuated control rod depending from the said shaft, having a pawl at its upper end engaging the ratchet wheel and having its lower end within convenient reach of the fuselage, winding drums carried by the shaft within the said frames, flexible connections attached at one end to the said drums, said frames including side bars and end bars, flexible coverings normally rolled on the end bars and to which the said flexible connections are attached, and means for guiding the flexible coverings during inward movement toward the said shaft when the latter is released and rotates under tension of its spring, said guide means including vertically spaced guide strips disposed centrally in the frames parallel with and between their side bars and between which the flexible coverings are movable at their centers.

4. The combination with the fuselage of an aeroplane, of laterally spaced frames disposed horizontally thereabove and rigidly connected thereto, a rotatable winding shaft extending through both frames and having spring actuating means between the frames, and means to place said actuating means under tension, cover members normally rolled at the outer portions of the frames and having flexible connection with said winding shaft, means for normally holding the shaft against rotation, and manually controlled means for releasing the said holding means.

5. The combination with the fuselage of an aeroplane, of normally uncovered horizontally disposed frames connected thereto, flexible covers for said frames normally held in inactive position, normally inactive means for shifting said covers over the frames, and manually controlled means for releasing said last named means, and means within the frames to guide the covers in their movement, consisting of upper and lower curved rods intermediate the frame sides and between which the covers are movable, arranged to hold the covers in inverted saucer shape in the active position.

In testimony whereof I have affixed my signature.

LUIGI COLETTA.